May 17, 1966  R. T. ERBAN  3,251,444
ELECTROMAGNETIC SPRING BIASED CLUTCH HAVING
A NEGATIVE SPRING CHARACTERISTIC
Filed April 19, 1962  3 Sheets-Sheet 1

INVENTOR.
Richard Erban
BY

May 17, 1966 R. T. ERBAN 3,251,444
ELECTROMAGNETIC SPRING BIASED CLUTCH HAVING
A NEGATIVE SPRING CHARACTERISTIC
Filed April 19, 1962 3 Sheets-Sheet 2

INVENTOR.
BY Richard Erban

May 17, 1966 R. T. ERBAN 3,251,444
ELECTROMAGNETIC SPRING BIASED CLUTCH HAVING
A NEGATIVE SPRING CHARACTERISTIC
Filed April 19, 1962 3 Sheets-Sheet 3
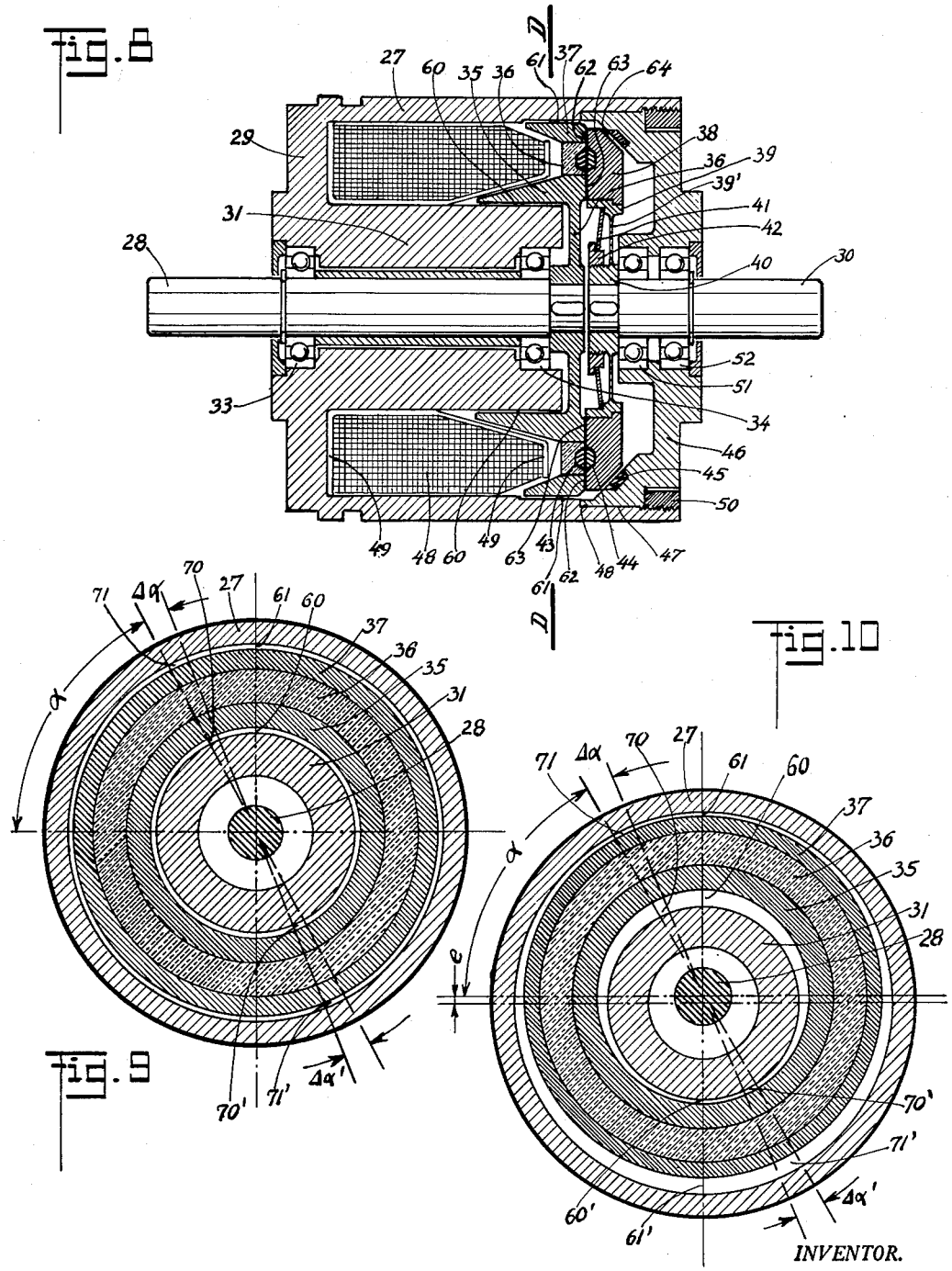
INVENTOR.

United States Patent Office 3,251,444
Patented May 17, 1966

3,251,444
ELECTROMAGNETIC SPRING BIASED CLUTCH HAVING A NEGATIVE SPRING CHARACTERISTIC
Richard T. Erban, 145—38 Bayside Ave., Flushing 54, N.Y.
Filed Apr. 19, 1962, Ser. No. 188,624
3 Claims. (Cl. 192—84)

This invention relates to clutches and brakes in which an axial magnetic pull generated by suitable exciter coils is utilized to cause controlled engagement of the friction clutch members.

Where such devices are employed as operating components of automatic tracking devices or of servo-mechanisms in connection with various automated control devices, it is found that the constantly increasing requirements for high torque capacity and short engagement time are often met only by sacrificing basic requirements for reliability of repeat performance and safety of operations; the result in too many cases is an objectionable high rate of operational failures.

It is, therefore, a prime object of my invention to provide an improved structure for electromagnetic clutches and brakes having a torque capacity which is a multiple of the values heretofore obtained with clutches and brakes of substantial identical size and weight. A further object of my invention is to create a structure which possesses an inherently rigid design which will maintain with great reliability the predetermined relative positions of the co-operating clutch members under all of the varying conditions of operation. This latter object I accomplish by a structure which eliminates the major portion of load deflections now present in such clutches and brakes; and as a further step I provide means for automatically compensating for the adverse results of the remaining deflections due to operational loads.

Still another object of my invention is to increase the effective pressure acting upon the friction members when engaged in actual contact with each other. This is achieved by a novel spring arrangement which substantially modifies and in certain cases even reverses the spring load-deflection characteristic heretofore obtained from conventional structures of the kind referred to.

The objects of my invention and the manner in which they may be carried out will be more clearly understood from a brief analysis of a clutch of conventional design and of the shortcomings which occur in its operation. For the purpose of this explanation, a clutch of conventional design is shown in the first five figures of the accompanying drawings in which FIG. 1 is a partial longitudinal section of an electromagnetic clutch of conventional design.

FIG. 8 is a longitudinal section of a clutch constructed in accordance with the teachings of this invention.

FIGS. 9 and 10 illustrate in diagrammatical cross section the structure by which the effects of load displacement are compensated in accordance with this invention.

FIG 12 furthermore illustrates the gain of available axial pressure over that obtainable with a conventional design.

Figure 1:
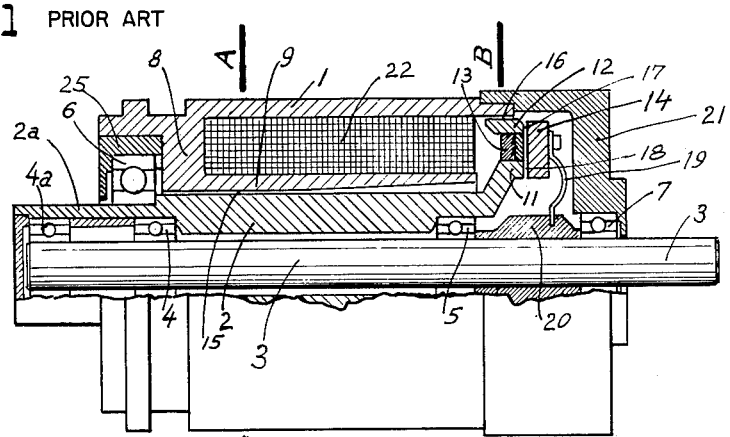

Referring now to the longitudinal section of a conventional clutch illustrated in FIG. 1, there is the input shaft 2 journaled directly upon the output shaft 3 by means of the bearings 4 and 5, respectively. The shaft 2 is supported from the clutch housing 1 only by one bearing 6 positioned at the left end of the housing; this bearing 6 therefore determines the location of the left end of the shaft 3 with respect to the housing only in an indirect manner, that is, via the extension 2a of the shaft 2, and the bearings 4 and 4a. The right end of the shaft 3 is supported directly from the end-cap 21, which in turn is centered upon the housing 1 at the location B—B.

The right end of the shaft 2 is provided with two concentric, ring shaped pole pieces 11 and 12 respectively, which are magnetically separated from each other by the ring member 13 made of non-magnetic material. The pole piece 11 is solid with the shaft 2 and the elements 13 and 12, respectively. are fastened concentric to 11 so as to form one solid member therewith. The output shaft 3 carries a ring element 14 made of magnetic material and supported from a hub 20 by means of resilient fingers 19. The ring surfaces of the elements 11–12 and 13 which are opposite to the ring surfaces of the element 14 are located substantially in one common plane which is perpendicular to the clutch axis.

Between the ring surface of the element 11 and the surface of 14 is an air gap 18, and between the ring surface of element 12 and element 14 is an air gap 17. These air gaps are normally of the order of several thousandths of an inch and are reduced practically to zero when the element 14 moves to the left into near contact with 12 under the influence of the magnetic pull. The coil 22 which is positioned between the outer shell 1 and the sleeve extension 9 of the end-flange 8, produces a magnetic flux which must transfer from the parts 8 and 9 to the input shaft via the transfer gap 15. This flux must also be transferred from the shell 1 via the transfer gap 16 to the element 12.

Figure 2:
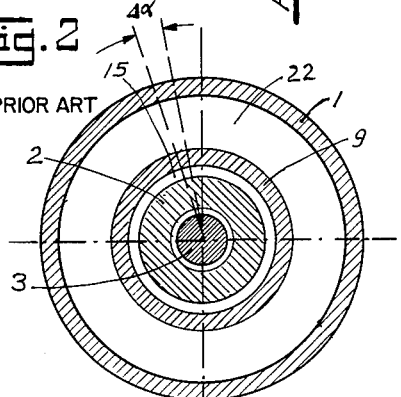
FIGS. 2 and 3 are schematic cross sections of the clutch shown in FIG. 1 taken along planes perpendicular to the clutch axis at the locations indicated by references A—A and B—B, respectively.
Figure 3:
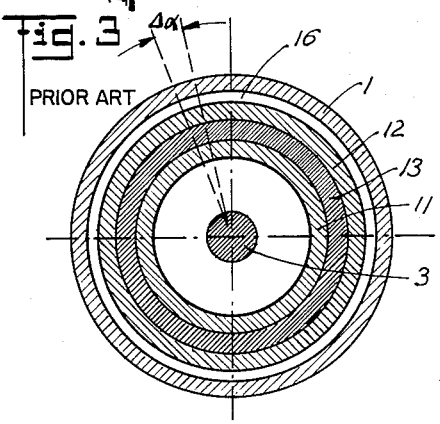

The magnetic flux which surrounds the coil 22 on all sides in a manner similar to the way in which a torodial winding surrounds a ring shaped core is determined in its size by the magnetomotive force F of the coil 22, and by the Reluctance R of the entire magnetic circuit. In a first approximation the torque capacity of a clutch can be regarded as being proportional to the magnetic pull, the friction-coefficient of the clutch surfaces when engaged, and the mean effective radius of the engaging friction surfaces. Since the size of the mean effective radius is closely limited by the maximum diameter of the clutch, no substantial increase in torque capacity can be expected by variations of this factor. In order to increase the friction coefficient, special materials as a lining for the engaging surfaces have been proposed; experience to date has shown however that special high friction coefficients tend to fade under continuous duty operation, so that such clutches, when operated at full rated capacity, have shown a rather low degree of reliability and are prone to frequent malfunction.

Where attempts have been made to increase the magnetic pull for a given size coil, it was found that anything but a small increase brought with its disturbing complications such as substantial drag torques of the shafts and even complete binding between the clutch members and the housing in certain positions of the shafts. I found that these failures were mostly caused by severe unbalanced forces which increase the load deflections of bearings and shafts. Such deflections result in radial dislocations of the rotating elements with respect to the geometrical clutch-axis. In FIGS. 2, 3, 4 and 5 it is shown how these unbalanced forces arise in a conventional structure as illustrated in FIG. 1. The cross sections along the planes A—A and B—B are shown in FIGS. 2 and 3, respectively. Note that these figures illustrate ideal conditions of perfect concentricity of all parts. It is seen that under such conditions the radial distance between the cylindrical surfaces of parts 2 and 9 in FIG. 2, and of parts 1 and 12 in FIG. 3, which is the effective length of the air gap, is constant along the entire periphery of each gap. The air gaps are shown at a greatly enlarged scale for reasons of clarity.

Under theoretical conditions of FIGS. 2 and 3, the field intensity or field strength H of the magnetic flux in the air gap is a constant factor along the entire periphery of each of the gaps 15 and 16, respectively. This is so because the reluctance $\Delta R$ of each small, sector-shaped portion $\Delta \alpha$ of the entire periphery is exactly equal to the reluctance $\Delta R$ of any other similar portion $\Delta \alpha$ regardless of where this small portion $\Delta \alpha$ is located.

The total magnetic circuit must be visualized as composed of a great number of wedge-shaped sector portions each having an angular width $\Delta a$ of equal size, and each of said portions carrying a partial flux $\Delta \Phi$. The sum of all of these partial fluxes is then the total flux $\Phi$, and this flux is distributed symmetrically with respect to the geometrical axis of the clutch and uniformly along the entire periphery. Under these conditions, the total Reluctance $R_a$ of a concentric transfer gap can be written as $$\frac{1}{R_\alpha} = \frac{2\pi(D_o+D_i)}{4} \cdot \frac{a}{l}$$

where $D_o$ is the outside diameter of the air gap
$D_i$ is the inside diameter of the air gap
$a$ is the axial length of the air gap
$l$ is the effective radial length of the flux path for a concentric air gap, $l=\frac{1}{2}(D_o-D_i)$ therefore $$\frac{1}{R_\alpha} = \frac{2\pi(D_o+D_i) \cdot a}{4\left(\frac{D_o-D_i}{2}\right)} = \pi a \frac{D_o+D_i}{D_o-D_i}$$

and since $D_o$ and $D_i$ as well as the axial length "$a$" are non-variable dimensions, the reluctance of a concentric air gap with a uniformly distributed field along its periphery is a constant figure.

Figure 4:
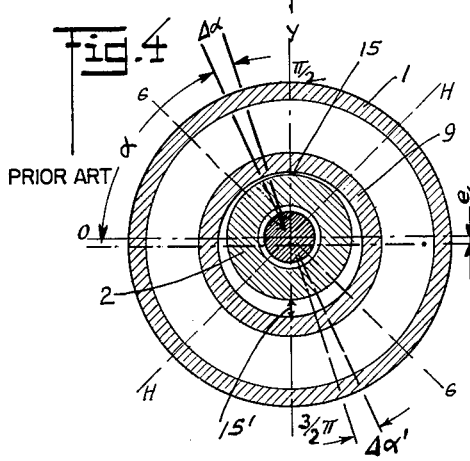
FIGS. 4 and 5 illustrate the relative displacement under load conditions of the elements shown in FIG. 2 and FIG. 3, respectively. These displacements are shown greatly exaggerated for the purpose of giving a clearer picture of the effect of such displacement upon the magnetic field.
Figure 5:
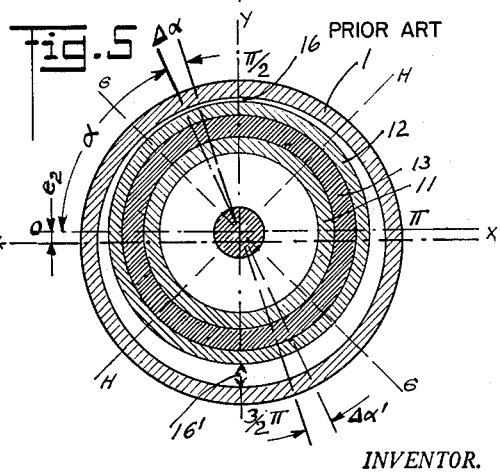

However, it is practically impossible to achieve true concentricity (with a zero tolerance) in actual manufacturing operations. Due to limitations in accuracy obtainable at reasonable cost of manufacture, there are necessary tolerances of dimensions and cumulative errors of assembled parts which result in eccentric locations of certain parts relative to each other. Deflections of shafts and bearings under load conditions further increase these displaceemnts of parts from their theoretically correct positions. The end result of such accumulation of errors is an eccentric position of the rotating parts with respect to the stationary parts, as illustrated in FIGS. 4 and 5. For the sake of clarity, the eccentricities and the crescent shape of the air gaps have been exaggerated.

Inspection of FIG. 4 shows that due to the eccentricity $e_1$ the gap 15 at the top is reduced by the amount $e_1$ while the gap 15' at the bottom is increased by the same amount $e_1$. The same basic conditions prevail in the gap shown in FIG. 5 where the top gap is shortened by the amount of eccentricity $e_2$ and the bottom gap is increased by the same amount $e_2$. Note that the eccentricity $e_1$ need not be identical with $e_2$. It should also be noted that FIGS. 4 and 5 are simplifications of the exact theoretical conditions; in each case the final eccentricity ($e_1$ or $e_2$ respectively) is a vectorial sum of the individual eccentricities of several parts and of deflections of parts caused by radial forces which are the result of non-symmetrical distribution of the magnetic flux. In both FIGS. 4 and 5, respectively, the four quadrants formed by the coordinate axes have been numbered, beginning with zero, to $\pi/2$, $\pi$, $3/2\pi$. Inspection shows that the radial width of the gap measured along a radius to either center, and which is in a first approximation the effective length of the magnetic path across the gap, varies along the entire periphery of the gap.

If a small sector with an angle $\Delta \alpha$ is considered, the effective gap length for the flux can be considered as a constant within the limits of the small angle $\Delta \alpha$. It is then seen that for a given eccentricity $e_1$, the effective length $l_a$ of the flux path across the air gap varies as a function of the angle. It will be a minimum for $$\alpha = \frac{\pi}{2}$$

and a maximum for $$\alpha = \frac{3\pi}{2}$$

It is to be noted that the eccentricities of both FIGURES 4 and 5, respectively, have their maximum for the same angle $\alpha$ since this is the most prevailing case. The cause for this lies in the fact that the biggest contribution to the cumulative eccentricity comes from the eccentricity and deflection of the shaft 3 near the point where it supports the element 2 through the bearing 5. Under these conditions, the effect of the total reluctance of the air gap upon the flux cannot be computed as before because the variation of reluctance along the periphery of the air gap causes a non-uniform distribution of the flux in the iron parts of the flux path.

In order to analyze the effect of an eccentric air gap upon the distribution of the flux along the periphery of the clutch, the entire periphery of the air gap is divided into small sector slices $\Delta \alpha$ and it is postulated that the reluctance within each sector slice has a constant value $R'$ which differs from the reluctance of its neighbors by a small amount $\Delta R'$. This partial reluctance for each sector slice can be written as $$R' = \frac{4l_a}{(D_o+D_i) \cdot a} \cdot \frac{1}{\Delta \alpha}$$

where

R′ is the reluctance of a small sector slice having an angle
$l_a$ is the length of the line of magnetic force across the gap; in a first approximation it is equal to the radial distance between the outer and inner gap surfaces.
$D_o$ is the outer diameter of the air gap
$D_i$ is the inner diameter of the air gap
$a$ is the axial length of the air gap
$e$ is the eccentricity of $D_i$ with respect to $D_o$
$\Delta\alpha$ is the width of the sector in radians The only parameter that may vary along the periphery is the effective gap length (radial) $l_a$ which can be expressed as a function of $D_o$, $D_i$, $e$, and the angle $\alpha$; it can be written as $$l_a = k \cdot f(e, \alpha)$$

where $k$ is a constant and $f(e,\alpha)$ a transcendental function. Substituting the value for $l_a$ in the above formula gives for the partial reluctance $$R' = \frac{4k \cdot f(e, \alpha)}{(D_o + D_i) \cdot a} \cdot \frac{1}{\Delta\alpha}$$

Combining all of the constant factors into one single $k'$ we have for the reluctance $$R' = k' f(e, \alpha) \frac{1}{\Delta\alpha}$$

The reciprocal value of the reluctance for each small sector slice with angle $\Delta\alpha$ is then $$\frac{1}{R'} = \frac{1}{k' \cdot f(e\alpha)} \cdot \Delta\alpha$$

and if $\Delta\alpha$ is made very small, the equivalent reluctance for the entire air gap ($\alpha = 2\pi$) is found as the sum of the reciprocal values of all partial reluctances, similar to the equivalent resistance of a multitude of resistance in parallel. The equivalent reluctance for the entire air gap ($\alpha = 2\pi$) with the eccentricity $e$ is then $$\sum \left(\frac{1}{R'}\right) = \sum \frac{1}{k' \cdot f(e\alpha)} \cdot \Delta\alpha$$

The eccentricity $e$ is a linear dimension measured in the same scale as the diameters $D_o$ and $D_i$; if the maximum width of the air gap, measured in radial direction, is denoted $l_{max.}$ and the smallest width of the gap similarly $l_{min.}$, the eccentricity is defined by $$2e = (l_{max.} - l_{min.})$$

This corresponds also to standard machine shop practice where eccentricity is taken as one half of the "runout" or "TIR" (total indicator reading, i.e., the difference between the highest and the lowest indicator reading).

However, this total, or equivalent reluctance of the gap itself is not very useful, because each minute sector of the transfer gap is also in series with a similar small slice of the iron parts of the entire magnetic circuit. When the working gap is in its closed position, the remainder of the circuit consists almost entirely of iron. The reluctance of this portion of the iron parts of the circuit can be written as $$R^1{}_i = \frac{l_i}{A_i \cdot \mu} = \frac{l_i}{A_i} \cdot \frac{1}{f\left(\frac{\Phi}{A_i}\right)}$$

where $\mu$ is the permeability of the iron as expressed by $$\mu = f(B) = f\left(\frac{\Phi}{A_i}\right)$$

where $R'_i$ is the reluctance of the iron parts of the circuit
$\Phi$ is the flux through the iron
$l_i$ is the length of the path of the flux
$A_i$ is the cross section of the iron perpendicular to the flux path
B is the flux density, or induction in the iron in gauss The entire iron circuit is composed of various parts of varying cross section and length, through which parts of the flux pass in series. For a given flux the permeability changes with the cross section. The resultant reluctance $R_i$ of the entire flux path through the iron can then be written for the sum of all partial reluctances as $$R_i = \sum \frac{l_1}{A_1 \mu_1} + \frac{l_2}{A_2 \mu_2} + \frac{l_3}{A_3 \mu_3} + \cdots$$

where $l_1$, $l_2$, $l_3$ are the length of the flux path in the parts 1, 2, 3 . . .
$A_1$, $A_2$, $A_3$ are the cross sections of the parts 1, 2, 3 . . .
$\mu_1$, $\mu_2$, $\mu_3$ are the permeabilities of the parts 1, 2, 3 . . .

The total flux $\Phi$ of a magnetic circuit composed of air gaps and iron parts is then found as $$\Phi = \frac{F}{R_a + R_i}$$

where $\Phi$ is the total flux
F is the magnetomotance (or magnetomotive force) produced by the known ampere-turns of the exciter coil.
$R_a$ is the equivalent reluctance of the air gaps
$R_i$ is the reluctance of the iron parts, all as above specified.

However, this formula is applicable correctly only when the density of the flux is constant along the periphery of each cross section, and this is true only in the case where the clutch members are exactly concentric with respect to each other as illustrated in FIGS. 2 and 3. In the case illustrated in FIGS. 4 and 5, the variation of reluctance along the periphery of the gaps 15 and 16 causes a variation of flux intensity, and consequently a variation of permeability $\mu$ in the iron parts along the periphery. The above given formula for $\Phi$ can then be applied correctly only for a very small sector or wedge slice $\Delta\alpha$ taken through the entire magnetic circuit in order to find the partial flux $\Delta\Phi$ for this portion of cross section positioned between the opening of the angle $\Delta\alpha$. The variation of $\mu$ is usually not given as a formula, but as a graph showing the saturation B in gauss as a function of the magnetic field strength (H) in oersted; from these data and the geometric dimensions of the circuit, a graph is constructed which shows the magnetic flux per unit cross section along the entire magnetic circuit as a function of oersted or of the ampere-turns of the exciter coil; this is often done by known point-to-point methods. From this graph it is then possible to compute a curve which gives the magnetic pull per unit cross section as a function of the length of the air gap, for a given number of exciter amp-turns.

Figure 6:
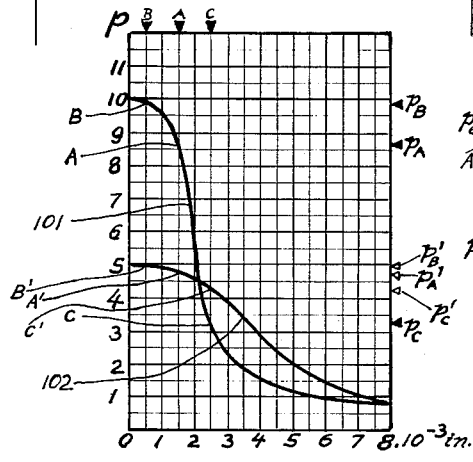
FIGS. 6 and 7, are graphs illustrating the variation of the magnetic forces under varying conditions of the magnetic circuit and the effects of the load displacement of the rotating elements upon the distribution and strength of the magnetic field.

In FIG. 6 there are illustrated two such curves. The curve marked 101 is typical of a magnetic circuit with a high efficiency ratio of pull per amp-turn, while the curve marked 102 illustrates a circuit with a much smaller pull; it is therefore less efficient, but it is also less sensitive to changes in the effective length of the air gaps. This curve 102 is typical of magnetic circuits which include iron parts having an induction B near the saturation level, or which have somewhere in the circuit air gaps that present a high reluctance. The coordinate system of FIG. 6 has its horizontal axis marked in thousandths of inches effective length of the magnetic flux through the transfer gap while its vertical axis is marked in pounds pull per unit cross section, the pull being measured at the working gap when it is at its minimum length of flux path, that is, in the position when the friction surfaces are engaged.

The effect of eccentricity in the transfer gaps upon the pull produced at the working gap is easily seen from FIG. 6. If we suppose that a clutch with the graph 101 is used with clearance of .003″ between the outer and the inner diameters of the transfer gap, we have a radial length of the flux path through the gap of .0015″ as indicated by the ordinate marked "A." This gives a specific pull of about 8.6. In a truly concentric clutch this specific pull is the same for any point along the entire periphery of the working gap; the total pull is then the area of the working gap multiplied with the specific pull $p$.

Referring now to FIGS. 4 and 5, and postulating an eccentricity $e_1$ of .001″ in the direction of the positive Y axis, we find that the transfer gap at the position $$\alpha = \frac{\pi}{2}$$

equals the original length $l_c$ of the concentric gap minus the eccentricity $e_1$. At the position diametrically opposite, that is, for $$\alpha = \frac{3\pi}{2}$$

the gap now is $l_c + e_1$. Thus for the postulated dimensions, the minimum gap at point 15 is .0005″ and the maximum gap at point 15′ is .0025″. Referring again to FIG. 6, the ordinate point for .0005″ gap is marked B and for the .0025″ point it is marked C, respectively. The intersection points of these ordinates with the curve 101 denote the specific pull for each point, marked $p_b$ and $p_c$ respectively. It is seen that the increase in pull due to the shortening of the transfer gap is much less than the loss of pull due to the increase of length of the gap at 15′. For all points between the maximum and the minimum gap, the specific pull can be found by entering the gap length for any given value of the angle of position alpha on the horizontal axis in the diagram of FIG. 6 and reading the ordinate of the respective intersection point with the curve 101.

Figure 7:
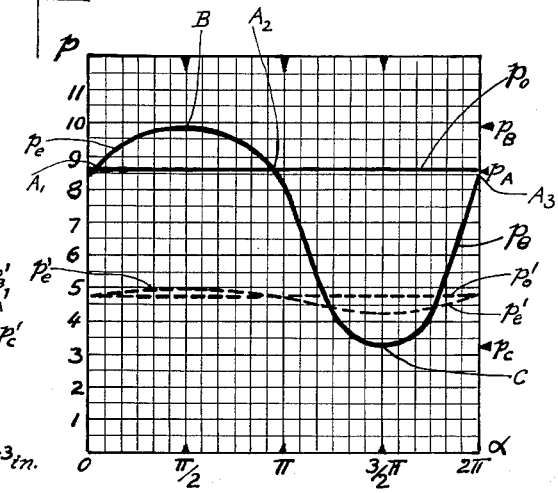

These varying specific pulls are now plotted in a graph as shown in FIG. 7, where the angles of position alpha are marked on the horizontal axis and the specific pull $p$ is marked on the vertical axis. Starting from a position of angle alpha=zero, that is point $A_1$, where the specific pull for the eccentric gap is nearly the same as for the concentric gap and is marked $p_A$, it rises to the maximum marked $p_B$ at the point marked B for an angle alpha=$\pi/2$ from there it decreases down to the value $p_A$ for a point with an angle alpha=$\pi$; progressing further to an angle alpha=$3\pi/2$ the specific pull decreases to its minimum $p_C$ at the point C after which it rises again to reach the value $p_A$ for an angle alpha=$2\pi$. It is seen that the curve so obtained, and marked $p_e$ gives the relation between the angle alpha and the specific pull for each point along the periphery. The straight line marked $p_o$ gives the relation for the case where eccentricity equals zero (that is, for perfect concentricity), in which case $p_o$ is a constant value.

Since the working gap is a ring shaped area of a constant radial width, the partial area of a sector of angle alpha is in linear proportion to the angle alpha in radians. It is seen in FIG. 7 that the total pull for the case of perfect concentricity (specific pull $p_o$) is the rectangular area under the horizontal line $p_0$ for alpha between zero and $2\pi$. Similarly, the total pull for the case of eccentric transfer gaps with a specific pull $p_e$ is the area under the curve $p_e$ between the ordinates at alpha zero and alpha=$2\pi$. It is seen that the loss in area is much greater than the gain, so that the total pull in case of an eccentric transfer gap shows a substantial loss as against the case with a perfectly concentric transfer gap.

The curve 101 in FIG. 6 cannot easily be expressed by a formula due to the rather irregular variations of the permeabiilty of the iron parts of the magnetic circuit, and graphic methods are indicated. The curve $p_e$ is therefore also obtained by graphic methods and graphic integration is used to obtain the area $A_1$–$A_2$–B–$A_1$ which represents the gain in pull, and similarly the area $A_2$–C–$A_3$–$A_2$ which represents the loss of pull. For the conditions illustrated, the loss in total pull for an eccentric transfer gap with the specified eccentricity is about 17% of the total pull under perfectly concentric conditions. For eccentricities greater than 0.001″ the decrease in pull is proportionately greater.

In addition to the loss of pull, there exists a further adverse effect of the eccentricity in the transfer gap. Any magnetic flux transecting an air gap generates a pull substantially at right angles to the surfaces of the gap. Since the transfer gaps have cylindrical surfaces, the pull generated there is substantially radial. In a concentric transfer gap, the flux density (or field strength) is the same at each point of the periphery of the gap, so that all radial components balance each other completely.

In the case of an eccentric transfer gap, this balance of radial pulls is upset and the resultant radial pull is directed towards the point of minimum gap length, because of the maximum flux density at this point. This force tends to increase the existing eccentricity still further, thereby aggravating the situation by further increase of the unbalance of radial pull. It is this condition which in structures of conventional design leads to the creation of excessive drag torque because of progressively increasing shaft deflections which finally results in binding between relatively rotatable elements.

An inspection of FIG. 1 shows that the right hand end of the shaft 2, which carries the ring element 12, is supported by the bearing 5 from the output shaft. This shaft in turn is supported on two widely spaced points, the bearing 7 to the housing cover 21, and the bearing 4 located within the shaft 2 itself at a point where the shaft 2 is supported on its outside by the bearing 6 from the housing 1.

It is seen, therefore, that seven tolerances are added to one another to form the final tolerance of concentricity which determines the location of the outer cylindrical surface of the ring 12 relatively to the inner cylindrical surface of the housing 1, these two cylindrical surfaces forming between them the transfer gap 16. The smallest of these tolerances concern the runout of the inner races of the bearings 5 and 6 which may be not over 0.00005″ each. The outer races of the bearings may have a runout of 0.0001″ each and the other four elements of the clutch have manufacturing tolerances of at least 0.0002″ each; the total accumulated eccentricity will then be between 0.0007″ and 0.001″. To this figure has to be added the deflection of the shaft 3 which, depending upon the eccentricity of the magnetic pull may vary between 0.0003 to 0.0006″. The sum total of all these eccentric displacements may vary between 0.0006 and 0.001 inch. This shows that a clutch of conventional design, if provided with a transfer gap of 0.0015″ radial length will be loaded within the range of operational failure when it is attempted to incorporate a high-efficiency high specific pull magnetic circuit.

These difficulties and limitations of conventional clutch design can be avoided by using a magnetic circuit of lower efficiency such as illustrated by curve 102 in FIG. 6. It is seen that variations of the magnetic pull due to eccentricity of the rotating parts are greatly reduced. If the radial gap for perfect concentricity is taken as 0.0015″ (same as before), it is seen that the gain and loss of magnetic pull caused by the same postulated eccentricity as before (0.001″) are greatly reduced. This is more clearly seen in FIG. 7 where a broken line illustrates the relative gain and loss of total pull. It is also seen that the use of a somewhat wider gap to begin with will not greatly reduce the available pull. It is the flat portion of the curve 102 which makes the entire structure less sensitive to variations in the radial length of the transfer air gap and therefore less sensitive to eccentricities of the parts forming this transfer gap. FIG. 7 also shows clearly the price paid for this relief, which is a loss of nearly ½ of the torque capacity of the clutch with the high-efficiency magnetic circuit.

In order to eliminate these serious limitations to the torque capacity encountered in clutches of conventional design as described hereabove, I have introduced several basic improvements of the structure of electromagnetic clutches as hereinafter more fully explained. One of these improvements consists in placing the main bearing which supports the rotating element forming the transfer gap substantially within the geometric space delimited by the axial extension between the two cross sectional planes which mark the ends of the transfer gap itself, so that any radial forces arising from non-uniform flux distribution in the transfer gap are borne directly by the bearing with a minimum of overhang, avoiding bending deflections. This preferred structure is illustrated in FIG. 8 where the bearing 34 is placed inside the axial reach of the transfer gap 60 and also within the axial reach of the transfer gap 61. The second basic structure is the support of the bearing 34 directly from an extension 31 of the housing 27. While it is not necessary that the sleeve portion 31 is made out of the same piece of material as the housing 27 and the flange portion 29, it is essential according to this new structure that these parts are assembled to form one body by such methods that they remain in one rigid piece for the purpose of assembling or disassembling the composite part into the clutch proper. This requirement arises from the fact that the seat of the outer bearing ring of the bearing 34 must be concentric with the bore of the housing where it forms the transfer gap 61, within a maximum eccentricity of 0.0001 to 0.0002" and this cannot be maintained unless both parts are permanently locked together into one rigid element.

A further basic improvement resides in the relative positioning of the rotary with respect to the stationary elements which form the transfer gaps between their respective surfaces, the arrangement being such that the effects of residual eccentricities in the transfer gaps upon the distribution of the magnetic flux tend to compensate each other. It is seen that the flow of the magnetic flux at the inner transfer gap 60 is from the stationary part 31 to the rotating part 35. At the outer transfer gap, the direction of the flux is from rotating part 37 to the stationary part of the housing 27. This is clearly seen in FIG. 9, which is a section through FIG. 8 along the plane indicated by D—D. The flux coming from the inner pole piece 31 goes radially outward through the transfer gap 60 into the rotating part 35. From there it goes axially into the second armature 38, FIG. 8, through the inner working gap 63. From the second armature 38 the flux returns axially crossing the outer working gap 62 into the outer ring 37, and from here it flows radially outward through the transfer gap 61 into the shell of the housing 27. The two elements 35 and 37 rotate as one piece since they are permanently locked together by the non-magnetic material piece 36.

FIG. 9 shows the cross section along the plane D—D for the case of perfectly concentric location of the rotating parts 35–36–37 with respect to the stationary parts 31 and 27 respectively. Note that 35–36–37 form one solid piece and that the relative position of the outer surface of 31 forming the gap 60 with respect to the inner surface of the shell 27 where it forms the gap 61 is unalterably established by the geometric form of the part 31–27 and not subject to possible dislocation errors during assembly or disassembly of the clutch. The transfer gap surfaces of the rotating armature 35–36–37 which is supported by the web 39 from the hub 40 permanently mounted upon the shaft 28, are machined to final tolerance from the shaft 28, and are thereafter not disassembled from the shaft, but form one solid body with the shaft. In this way very close tolerances of concentricity can be maintained between the shaft 28 and the transfer gap surfaces of the rings 35 and 37, respectively.

The structure above described reduces the eccentricity of the transfer gaps to a fraction of the values obtainable by conventional design under conditions of equal manufacturing precision. In order to eliminate the effects of small residual amounts of eccentricity upon the magnetic flux, it is among the objects of this invention to provide means which will automatically compensate to a large degree the adverse effects of one gap with the adverse effects of the other gap. This is illustrated in FIG. 10 where the eccentricities are shown at an enlarged scale. It is seen that an eccentricity $e$ displaces the center of the shaft 28 upwards, and with it the center of all rotating parts 35–36–37; the outer transfer gap 61 is then narrowest at the top position and widest at its bottom position 61'. Conversely, the inner gap 60 is widest at its top position and narrowest at its bottom position 60'. The partial magnetic flux within a sector slice within an angle $\Delta\alpha$ can then be traced in its flow from the inner part 31 to the outer part 27; going radially outward from 31 it crosses the inner transfer gap at 70, where the gap is wider due to eccentricity. The path from part 35 to 37 is the same as for the case of concentric gaps (FIG. 9). The same partial flux then goes radially outward from part 37 across the outer transfer gap at 71, where this gap is narrower than in the case of concentric gaps (FIG. 9). It is seen that the sum of the radial length of the transfer gaps remains substantially unchanged for a sector with angle $\Delta\alpha$ so that the reluctance of the air gaps does not vary. Since the reluctance of the iron path is also a constant for the same amount of flux, the entire reluctance for a sector slice of the entire magnetic circuit remains practically unchanged regardless of the amount of eccentricity, provided the total amounts of eccentricity remain small, compared to the diameter of the air gap surfaces. A similar compensation takes place in a sector slice with angle $\Delta\alpha$ located at 180° from the first sector slice. It has been found that for conditions where the eccentricity is about 1/1000 of the diameter of the transfer gap, or between 0.0005 and 0.001" for a diameter between 0.800 and 1.500 inches, or less, a very satisfactory compensation is obtained. It is understood that the conditions for complete compensation include identical magnetic field strength (H) and the same original (concentric) radial length for both transfer gaps.

Referring again to FIG. 8 it is seen that the rotating member, or input shaft 28 and armature 35–36–37 are illustrated as supported directly from the housing 27–29–31 through the bearings 33 and 34. The parts 31–29–27 are illustrated as being made of one piece of metal, but it is understood that they may be made as an assembly of several separate pieces provided that this assembly is permanent so that the three critical surfaces, that is, the bore holding the outer race of bearing 34, the O.D. of part 31 where it forms the gap 60, and the inner diameter of 27 where it forms the gap 61, are rigidly held in their relative position of concentricity with a minimum error. This concentricity with minimum tolerance is obtained in a practical and economical method of manufacture by finish machining to the ultimate tolerance the named three surfaces in one and the same work setup. This can be achieved because the housing 27 with its flange portion 29 and its inner pole 31 is so constructed that these three surfaces are freely accessible to suitable tools entering the housing from the right side, while the housing can be rigidly clamped in one and the same position. The structure above described thus permits an economical manufacturing process while holding the tolerances of eccentricity between any of the named three surfaces to less than 0.00015", and to maintain the same tolerances during assembly of the clutch.

The space for the coil 48, wound upon the spool 49 may be bored out of solid block 27, if the housing is made of one piece of material; or the space for the coil may be made by providing a permanent assembly of several parts which surround the cavity for the coil. It is seen from FIG. 8 that the structure is such that the machining of all critical surfaces can be done in one and the same setup, and that the housing diameter 47 which together with the shoulder 48 determines the concentric position of the cover 46 can also finish machined at the same setup with the finish machining of the critical bearing surfaces and air gap surfaces. The cover 46 is provided with a similar structure that ensures the concentricity of its outer diameter 47 with the bore for locating the ball bearing 51 and with the friction-surface 45 of the cover 46. The cover 46 is centered from the critical surface 47 of the housing 27 and it is pressed against the shoulder 48 by the threaded ring 50. There is then a minimum of additional concentricity errors plus the bearing tolerances of the bearing 51, which sum determines the error from correct concentric location of the center of rotation of the armature 38 with respect to the surface 47 of the housing 27. It has been pointed out heretofore that a high degree of concentricity must be achieved between the surface 47 and the center of rotation of the rotating armature 35-36-37 because of the conditions in the transfer gaps. It is equally important that the armature 38 should have a high degree of concentricity relative to the armature 35-36-37 because it is these two rotary members which enter into frictional contact in order to transmit power from one shaft to the other. An analysis shows that any eccentricity between these two members will produce, while they are in frictional engagement, radial forces which cause additional load upon the bearings 34 and 51 which forces tend to increase the eccentricity; the eccentricity also causes a small sliding motion in radial direction between the friction surfaces of 35-36-37 on the one side and of 38 on the other side. This sliding takes place under the full axial pressure of the engaged clutch and produces a drag torque or binding against the housing. Another adverse effect of the eccentricity and the ensuing sliding radial motion is the reduction of the coefficient of friction between the engaged friction surfaces. This causes a further decrease of the torque capacity of the clutch since the slight motion at right angles to the transmitted tangential force tends to break the friction bond.

Inspection of FIG. 8 discloses that the armature ring 38 made of magnetic material (that is, a material with a high permeability at a high induction of 20 to 24 kilogauss) is supported from the shaft 30 by the hub 40 which extends into a very thin yieldable web 39' having a rim 39. The ring 38 is rigidly fastened to the rim 39. While the web 39' is shown made in one piece with the hub 40 and the rim 39, the web 39' may also be secured to the rim 39 and to the hub 40 by brazing, welding or other method which by rigidly holding the edges of the web assures permanent concentricity of the rim 39 relative to the hub 40 while at the same time yielding to limited axial motions of the rim 39 relative to the hub 40 without producing a biasing force tending to oppose the magnetic pull in the direction from the ring 38 towards the armature 35-36-37.

This yieldability of the web 39' may be further increased by providing slots in the web which produce an effect similar to a system of tangential spokes in the central plane of a wheel, which holds the rim of the wheel concentric to the hub but does not give the rim lateral stability. It is in the nature of such a system of tangentially stressed elements that it is capable to transmit substantial amounts of torque in either direction between the hub and the rim.

In another aspect of my invention, a somewhat thicker web is employed and the flexural forces produced by its deflection are utilized to produce a biasing of the ring 38 in the direction of the magnetic pull, that is, towards the armature 35-36-37, as will be more fully explained below.

Inspection of FIG. 8 further discloses that the left face of the ring 38 forms the working gaps 62 and 63, respectively, with the ringfaces of the parts 35 and 37 which together with the part 36 form the armature of the shaft 28. In FIG. 8 these working gaps are shown in closed position, that is, the coil 48 is supposed to have been energized and the armature 38 has been pulled into frictional contact with the armature 35-36-37. Special friction surfaces of suitable material, 43 and 44, respectively, may be provided to protrude slightly over the surface of the magnetic faces forming the working gap, so as to prevent wear to occur on the magnetic faces due to direct contact. In this latter case the air gap at the working gaps is not reduced to zero when the clutch is engaged, but may have a value of about 0.0005 to 0.0015" per air gap.

FIG. 8 discloses further a new structure for imposing upon the armature ring 38 a resilient force tending to move the member 38 away from the proximity of the armature 35-36-37, that is, tending to push it toward the right and into contact with brake surface 45 of the end cap 46. This puts on the shaft 30 a brake torque depending upon the axial pressure between the member 38 and the friction face 45, as well as the mean radius of the friction surface 45 and the friction coefficient. It is seen that the friction surface 45 and the cooperating surface of the member 38 are inclined at an angle of about 45° to the clutch axis (that is, both these surfaces are cone surfaces with about 2 x 45° cone-apex angle). This is done to increase the effective pressure between the engaging friction surfaces which is a well known practice in cone type friction clutches.

In an arrangement such as illustrated in FIG. 8, which is also known under the term of clutch-brake, it is obvious that the axial force available to produce a clutch torque between the friction surfaces 43-44 consists of the axial pull of the magnetic circuit with the working gaps nearly closed, minus the spring force tending the member 38 towards the right into contact with the friction surface 45. This spring force is supplied by the bevel type spring 41 which bears at its outer diameter against the rim 39 of the web 39' and which at its inner diameter is pressed adjustably towards the right side by the adjustment nut 42. If a spring of conventional design, such as illustrated in FIG. 1, having a substantially direct proportional force-deflection diagram, is used in the place of 41, it is seen that the force pushing 38 to the right is at a maximum for the point of the maximum spring deflection, that is when the member 38 is engaging the friction surfaces of the armature 35-36-37. The axial force available for engaging the friction clutch is then the maximum magnetic pull minus the maximum spring force. Conversely, the spring force decreases with the expansion of the spring when the member 38 moves towards the right side into contact with the brake friction surface 45. At this point, there is then only the minimum force of the expanded spring available for actuating the friction brake 38-45 which produces a brake torque upon the shaft 30.

As a result of this interplay between magnetic pull and opposing spring pressure, it is found that for a clutch of given dimensions, transmitting a specified torque when used as a clutch only without any substantial spring force opposing the magnetic pull, this torque $T_o$ represents the maximum clutch torque which is produced by 100% of the magnetic pull acting to engage the friction clutch surfaces. It is then seen that this same clutch when provided with a substantial spring to produce also a brake torque, will deliver at best only ½ of $T_o$ as a clutch torque together with ½ $T_o$ as a brake torque.

Figure 12:
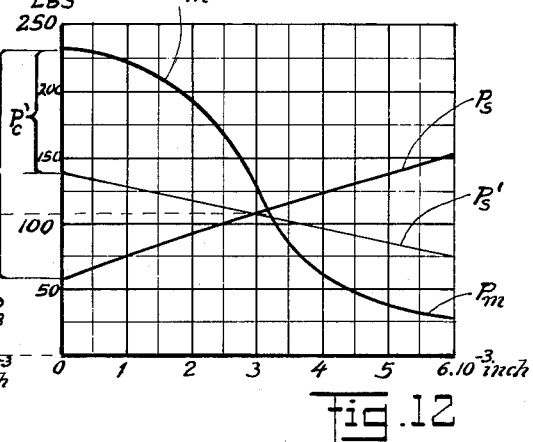
FIG. 12 illustrates in a load-deflection diagram the variation of available axial pressure within the operating range of a clutch embodying the novel spring structure in accordance with this invention.

This is more clearly seen from the graph shown in FIG. 12 where $P_m$ denotes a curve which gives the magnetic pull in relation to the width of the working gap between zero and 0.006″ air space. The forces are computed for a clutch of the design illustrated in FIGURE 8 having an outside diameter of 1.8 inches (housing O.D.). Note that FIG. 8 is a reproduction at reduced scale of a drawing of a clutch actually built so that all parts are shown in true relation to each other.

Referring again to FIG. 12, it is seen that the maximum pull for zero gap is about 230 lbs. and that the pull available at 0.003″ gap is about 125 lbs. If 0.003″ is stipulated to be the total travel of the member 38 between the clutch faces on the left and the brake face at the right, it is obvious that the spring force at brake contact (i.e., for a clutch gap of 0.003″) must be a little less than the magnetic pull available at this point in order to be sure that the magnetic pull will lift the member 38 off the brake contact against the pressure of the spring. The spring curve is illustrated by $P_s'$ for a conventional spring design and it is seen that the spring pressure rises as the spring is compressed by the magnetic pull which moves member 38 to the left. The magnetic pull for a clutch gap of 0.003″ as above mentioned is 125 lbs., FIG. 12. The spring force at this point is 105 lbs., leaving about 20 lbs. excess of magnetic pull over the brake spring force to assure lifting of the brake by the magnetic pull. From this point of 105 lbs. the spring force rises to about 135 lbs. for a deflection of 0.003″ from the point of 105 lbs., which corresponds to zero air gap of the clutch. Therefore, the difference between the magnetic pull and the spring force at this point is 230 minus 135, or 95 lbs., denoted as $P_c'$ in FIG. 12. This is the force available for producing clutch torque and it is seen that less than one-half of the total magnetic pull is utilized for the generation for the generation of clutch torque.

FIG. 12 also discloses the operating characteristic of the new spring structure according to my invention. The basic concept of this structure is the embodiment of a spring system which has a negative characteristic, that is, a force-deflection characteristic which is opposite to that shown by a conventional spring system. In a conventional spring system, the spring force increases with increasing deflection of the spring, so that maximum spring force is developed at maximum deflection; that is also termed a positive characteristic. In contrast hereto, the spring system embodied in electro-magnetic clutches according to this invention starts with the maximum force and the force gets smaller as the deflection increases. For a certain point of the deflection diagram, the spring force may be zero. Springs of this type are inherently unstable over wide ranges and stable only in limited areas. Provision must therefore be made to limit the operation to the stable areas of the system.

A negative spring characteristic is shown in FIG. 12 and denoted $P_s$. For a clutch gap of 0.003″, that is when the member 38 is engaging the brake surface 45, the spring is at its greatest extension and produces a pressure to the right of 105 lbs. Under the influence of the magnetic pull the member 38 moves to the left until the clutch gap becomes zero at which point the spring is compressed 0.003″ from the previous point. The spring pressure is now only 55 lbs., so that a force $P_c$ equal to 230 minus 55, that is 175 lbs. is available for engaging the clutch surfaces. This is about 184% of the clutch force available with a conventional spring system giving the same brake torque.

Figure 11:
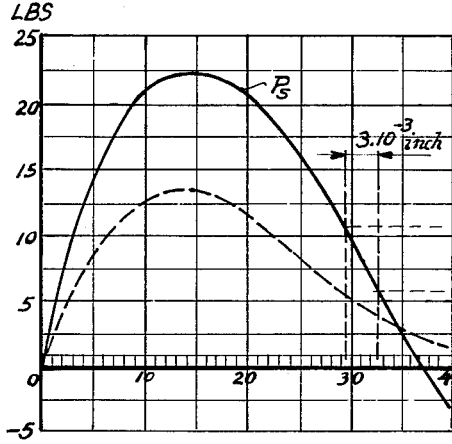
FIG. 11 is a graph showing the load-deflection diagrams of the novel spring arrangement which may be used in connection with a clutch of the kind shown in FIG. 8 to obtain a further increase of the torque capacity of the clutch in accordance to the teachings of this invention.

A preferred form of a spring system designed to achieve the required negative characteristic is based upon a combination of spring elements of tapered ring shape also known as Belleville spring. The force-deflection curves of two typical springs of this kind are shown in FIG. 11. The forces delivered from these springs rise sharply from zero (for the spring in its natural state without any externally imposed deflection) to a maximum for a certain amount of deflection (positive branch of the characteristic) and thereafter decreases with further deflection (negative branch of the characteristic). Depending upon the dimension of the outer and inner diameter of the spring disk and its taper, the characteristic will be more flat or steeper, and may even cross the horizontal coordinate axis; this means that the spring if compressed beyond the point on the axis will become unstable.

Figure 13:
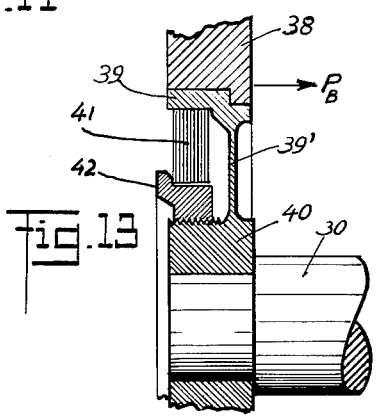
FIG. 13 illustrates a detail of the clutch shown in FIG. 8 at an enlarged scale of 2:1.

The diagram of forces developed in FIG. 12 requires a certain negative slant of the spring characteristic and in order to obtain this slant, it is necessary to have a rather steep spring curve, which means, a spring that changes its sign of direction as illustrated by the heavy line marked $P_s$ in FIG. 11. The space available for the spring in a clutch of the general design referred to will in all practical cases prove insufficient to accommodate a spring of the required characteristic. This difficulty is eliminated by providing a spring for a fraction of the total force required and designing this spring to fit the spatial limitations as well as the requirements for inclination of the characteristic (or rate of change per unit of deflection) and then provide a package of several springs as illustrated in FIG. 13 at 41. The other parts shown in FIG. 13, such as part of the shaft 30, the hub 40, web 39′, rim 39 and armature ring 38 are enlarged cross sections of the the same parts shown in FIG. 8. The ring nut 42 permits to adjust the initial pressure of the spring system 41.

Figure 14:
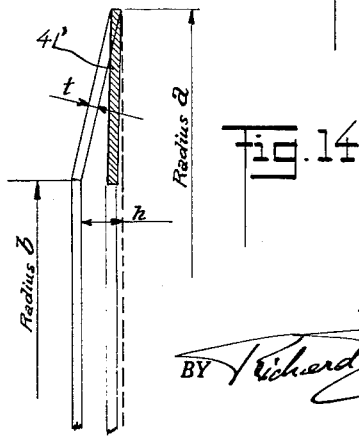
FIG. 14 shows a partial section of one single spring element of the kind employed in the structure shown in FIG. 13.

A partial cross section of a single spring element 41′ is shown in FIG. 14 at a greatly enlarged scale. The cross hatched section shows the spring deflected to the point where it develops about ⅟₁₀ of the force which is required to operate the brake. The position indicated by a fine full line is the position of the spring when it is free, that is, without any axial pressure. The position of the spring for the case where the clutch is engaged (that is, maximum deflection of the spring) corresponds approximately to the cross hatched position, or slightly to the right thereof. The characteristic of spring elements of this type depend upon the following parameters: the inner diameter, the outer diameter, the thickness $t$ (FIG. 14) and the "free height" $h$ (FIG. 14).

By way of example it is noted that the full line curve denoted $P_s$ in FIG. 11 shows the load deflection relation for a single element having the following dimensions: thickness $t=0.008″$, outer diameter 0.810″, inner diameter 0.540″, free height $h=0.032″$; material: spring steel, hardened. The spring is used between the deflections of 0.0295″ and 0.325″, which gives a total range of 0.003″. The axial pressure for the single element deflected to 0.295″ is 10.5 lbs. and for a deflection of 0.325″ it is 5.5 lbs. The composite spring 41, FIG. 13, which comprises 10 elements produces therefore a pressure of 105 lbs. for operating the brake and this pressure drops to 55 lbs. when the clutch is engaged (i.e., compressing the spring system by 0.003″). These relations are substantially illustrated in FIG. 12 where $P_m$ is the magnetic pull available and $P_s$ is the axial pressure of the composite spring which opposes the magnetic pull. The forces and deflections shown in FIGS. 11 and 12 are substantially correct for a clutch with an outside housing diameter of about 1.8″ as previously mentioned. The maximum magnetic pull obtained from the magnetic circuit substantially as shown, is 227 lbs. with the coil 48 being energized by 3.8 watts, and with the condition that high quality magnetic iron having permeability of about 200 at 24,000 gauss is used for the parts 35, 37, and 38.

The torque capacity of the clutch depends to a considerable extent upon the friction coefficient of the friction lining 43–44 and 45; surprisingly high values have been reported with various materials of organic and semi-organic composition. While coefficients as high as 0.6 and even higher seem to have been achieved in some cases, yet these friction materials appear to be very sensitive to frequent load cycling under maximum torque so that the torque capacity of such clutches tends to fade under severe load conditions; the repeat performance of the clutch becomes unreliable. Friction materials of sintered metal and ceramic compositions will stand up under continuous heavy duty service, but the friction coefficient available is much lower than the above mentioned figures. Even the conservative values of 0.3 to 0.35 which are often claimed do not always allow for reliable repeat performance. I have found that for commercially available inorganic anorganic (metallic) friction lining material, a coefficient of between 0.25 and 0.27 should not be exceeded where reliable operation is required.

Using these figures as a basis, together with the previously mentioned values for magnetic pull and spring forces, I have found by actual tests that a clutch built to the design disclosed in FIG. 8 will show a maximum torque capacity of between 550 and 600 inch-ounces when used as a clutch only, that is without a spring for producing a substantial brake torque. When used with a spring system of the kind described in connection with FIGS. 8, 11, 12, 13 and 14, the same design will safely transmit 300 inch-ounces as clutch and have a brake torque of substantially the same value. This is substantially more than twice the torque capacity of any electromagnetic clutch of similar dimensions known at present. The use of clutches constructed in accordance with the teachings of this invention therefore increases by a substantial amount the margin of safety in control devices of complex design where such clutches may be incorporated, and it should be noted that this increase in performance has been achieved without any increase in weight, space requirement, or any increase in energy required to operate the clutch.

It will be understood that the invention is not limited in its application to the specific design disclosed in FIG. 8 nor need the different aspects of the invention be used in combination as shown in FIG. 8 and it is to be understood that for example the specific improvement disclosed in FIGS. 8, 11, 12, 13, 14 may be employed in clutches and brakes which do not embody the specific improvements disclosed in FIGS. 8, 9, 10 and that the improved spring system generally disclosed in FIG. 8 and specifically in FIGS. 11, 12, 13, 14 may be used advantageously in connection with many conventional designs of magnetic clutches and brakes.

What I claim is:

1. In a magnetic clutch of the kind referred to, two shafts in co-axial alignment, an exciter coil concentric with said shafts, a body of magnetic material partially surrounding said coil and adapted to provide for the magnetic field generated by said coil a continuous flux path interrupted at one place by a substantially wide gap in said body of magnetic material, a first rotatable ring-shaped armature adjacent said wide gap, a second rotatable ring-shaped armature closely adjacent said first armature so as to provide by the co-action of both of said armatures a magnetic bridge of lower reluctance for said flux across said wide gap, said first armature being rigidly fastened upon one of said shafts, the second of said armatures being fastened to said second shaft by a thin web holding said ring-shaped armature in permanent concentricity relatively to said shaft while said web is readily yieldable to limited axial displacements of said second armature without generating opposing axial forces of significant value, and a system of resilient means adjustable independently of said web for imposing predetermined resilient axial forces upon said second armature, said resilient means comprising at least one bevel type annular spring element and means for causing a predetermined pre-stress in said element for obtaining a negative spring characteristic in the operating range of said system of resilient means.

2. In a magnetic clutch of the class referred to, two independently rotatable shafts in co-axial alignment, an exciter coil concentric with said shafts, a body of magnetic material partially surrounding said coil to provide for the magnetic field generated by said coil, a continuous flux path interrupted by a wide gap in said body of magnetic material, said gap being formed between two radially spaced concentric cylindrical surfaces of said body which are coaxial with said shafts, two independently rotatable armatures closely adjacent to each other and to said cylindrical surfaces so as to form two concentric radial transfer gaps for the transmission of the magnetic flux between said body and said armatures, each one of said armatures being connected to one of said shafts respectively to transmit torque thereto, while providing limited axial movability of said armatures relatively to each other to permit frictional engagement of said two armatures, resilient means tending to increase the spacing between said armatures and opposing the magnetic pull which tends to bring said two armatures into frictional engagement when said coil is energized, said resilient means comprising a spring element having a negative characteristic whereby the spring force of the compressed spring is substantially lower than the spring force of the expanded spring.

3. In an electromagnetic clutch of the type which comprises axially aligned driving and driven members, an electromagnet, and an armature responsive to energization of said electromagnet, said armature causing frictional coupling between said driving and driven members by axial displacement of at least one portion of said armature relatively to one of said members, the improvement which comprises a radially rigid but axially readily yieldable element forming a connection between said axially displaceable portion of said armature and said one member and the provision of spring means opposing response of said armature to said energization for disengaging said frictional coupling, said spring means having a negative characteristic which reduces the magnitude of the opposition exerted by said spring means progressively as said coupling increases.

References Cited by the Examiner

UNITED STATES PATENTS

| | | | |
|---|---|---|---|
| 2,315,298 | 3/1943 | Thompson | 192—18.2 |
| 2,325,193 | 7/1943 | Nutt et al. | 267—1 |
| 2,407,757 | 9/1946 | MacCallum | 192—84 |
| 2,490,044 | 12/1949 | Garbarini et al. | 192—18.2 |
| 2,728,252 | 12/1955 | Connell | 192—89 |
| 2,729,318 | 1/1956 | Harter | 192—84 X |
| 2,899,037 | 8/1959 | Pierce | 192—84 |
| 2,953,227 | 9/1960 | Gilbert | 192—89 |
| 2,958,406 | 11/1960 | Pierce | 192—84 |
| 2,965,203 | 12/1960 | White | 192—18.2 |
| 3,036,680 | 5/1962 | Jaeschke | 192—84 |
| 3,052,335 | 9/1962 | Sulger | 192—84 |

DON A. WAITE, *Primary Examiner.*

DAVID J. WILLIAMOWSKY, THOMAS J. HICKEY,
*Examiners.*